United States Patent
Okuno et al.

(10) Patent No.: US 7,486,884 B2
(45) Date of Patent: Feb. 3, 2009

(54) IMAGING DEVICE AND IMAGING METHOD

(75) Inventors: Takayuki Okuno, Saitama (JP); Minoru Ishida, Tokyo (JP)

(73) Assignee: Sony Corporation, Tokyo (JP)

( * ) Notice: Subject to any disclaimer, the term of this patent is extended or adjusted under 35 U.S.C. 154(b) by 455 days.

(21) Appl. No.: 11/365,588

(22) Filed: Mar. 2, 2006

(65) Prior Publication Data

US 2006/0198625 A1 Sep. 7, 2006

(30) Foreign Application Priority Data

Mar. 7, 2005 (JP) .............................. 2005-062568

(51) Int. Cl.
*G03B 15/03* (2006.01)
*G03B 9/70* (2006.01)

(52) U.S. Cl. ........................................ 396/155; 396/166

(58) Field of Classification Search ................ 396/155, 396/161, 166, 169, 173, 182; 348/208.99, 348/208.4, 208.12, 216.1, 221.1, 362, 367
See application file for complete search history.

(56) References Cited

U.S. PATENT DOCUMENTS

2005/0104975 A1* 5/2005 Hayashi ................... 348/222.1

FOREIGN PATENT DOCUMENTS

JP 2005-038396 2/2005

* cited by examiner

*Primary Examiner*—Rodney E Fuller
(74) *Attorney, Agent, or Firm*—Rader, Fishman & Grauer PLLC; Ronald P. Kananen

(57) ABSTRACT

An imaging device comprising an imaging element for focusing incident light to a light receiving element by the shutter opening to generate image data; a flash for emitting a flash toward an imaging direction of the imaging unit; a controller for controlling the imaging element so as to continuously open the shutter a plurality of times and controlling the flash so as to emit a flash at a second and following opening timings among the plurality of opening timings; and an image processor for generating new image data based on the image data generated by the imaging element by the imaging at the opening timing when the flash does not emit a flash and the image data generated by the imaging element by the imaging at the opening timing when the flash emits a flash.

13 Claims, 18 Drawing Sheets

CHARACTERISTIC OF GENERAL FLASH

HISTOGRAM OF COMBINED IMAGE BY CORRECTED IMAGES

IMAGING DEVICE AND IMAGING METHOD

CROSS REFERENCES TO RELATED APPLICATIONS

The present invention contains subject matter related to Japanese Patent Application No. 2005-062568 filed in the Japan Patent Office on Mar. 7, 2005, the entire contents of which being incorporated herein by reference.

BACKGROUND OF THE INVENTION

1. Field of Invention

The present invention relates to an imaging device and an imaging method emitting a flash for imaging.

2. Description of the Related Art

Conventionally, when using a flash or other auxiliary illumination light under low illumination for imaging, as shown in FIG. 2, a dynamic range of an imaging element becomes insufficient in comparison with the dynamic range of the subject, and therefore the principal subject is imaged with a right exposure, but, as shown in FIG. 3, the background and other low illumination parts become out of the dynamic range of the imaging element, and therefore the corresponding regions end up being crushed to black. As a means for solving this, in imaging of a night view including a person or other low illumination subject, so-called "slow synchro" imaging setting a shutter speed, etc., so that the background has a right exposure and imaging the person or other principal subject by setting to the right exposure by a flash or other auxiliary illumination light is known. In general slow synchro imaging, however, in imaging of a night view including a person or other low illumination subject, the imaging is carried out by setting the shutter time so that the background has a right exposure and setting the right exposure for the person or other principal subject by a flash or other auxiliary illumination light. In this slow synchro imaging, the shutter time is to set match with the illumination of the background, and therefore the imaging is carried out by the shutter for a long time of about a few seconds. Unless preventing the shaking of the background by using a tripod or other fixing means, the image of the background ends up flowing due to so-called hand blurring.

In imaging under a low illumination where the shutter speed becomes long, for example, as disclosed in Japanese Patent Publication (A) No. 2005-38396, a so-called electronic hand blurring correcting means continuously imaging a plurality of photos at a shutter speed higher than the shutter speed achieving the right exposure, computing the amounts of movement of the images due to hand blurring, etc., correcting them and combining them into a single image is known. In this regard, a flash or other auxiliary illumination light generally has an afterglow characteristic, as shown in FIG. 4, and a color temperature characteristic different from natural light. For this reason, particularly at the time of afterglow, the natural light and the auxiliary illumination light are mixed to exhibit complex color temperature characteristics. When using the imaging device disclosed in Japanese Patent Publication (A) No. 2005-38396 combined with the above electronic hand blurring correcting means, the illumination and color temperature of the subject complexly change during the continuous imaging as shown in FIG. 5, so the image is apt to have unnatural color tones after combining the images.

SUMMARY OF THE INVENTION

It is therefore desirable to provide an imaging device and an imaging method able to generate a high quality image even when emitting a flash when continuously imaging a plurality of times while continuously imaging a plurality of times.

According to a first aspect of the invention, there is provided an imaging device comprising an imaging means for focusing incident light to a light receiving element by opening a shutter to generate image data a flash means for emitting a flash toward an imaging direction of the imaging means; a controlling means for controlling the imaging means so as to continuously open the shutter a plurality of times and controlling the flash means so as to emit a flash at a second and following opening timings among the plurality of opening timings; and an image processing means for generating new image data based on the image data generated by the imaging means by the imaging at the opening timing when the flash means does not emit a flash and the image data generated by the imaging means by the imaging at the opening timing when the flash means emits a flash.

According to a second aspect of the invention, there is provided an imaging device comprising an imaging means for focusing incident light to a light receiving element by opening a shutter to generate image data; a flash means for emitting a flash toward an imaging direction of the imaging means; a controlling means for controlling the imaging means so as to continuously open the shutter a plurality of times and controlling the flash means so as to emit the flash at any opening timing among the plurality of opening timings; a correcting means for applying first correction processing to the first image data generated by the imaging means by the imaging during no flash to generate first corrected image data and applying second correction processing different from the first correction processing to the second image data generated by the imaging means by the imaging during a flash to generate second corrected image data; and an image processing means for generating new image data based on the first corrected image data and the second corrected image data generated by correction by the correcting means.

According to a third aspect of the invention, there is provided an imaging method continuously opening a shutter a plurality of times and focusing incident light to a light receiving element by opening a shutter to generate image data, comprising a first step of opening the shutter in a state not emitting a flash to a subject to generate image data; a second step of opening the shutter in a state emitting a flash to the subject to generate image data continuing after the first step; and a third step of generating new image data based on the image data generated by the imaging in the first step and the image data generated by the imaging in the second step.

According to a fourth aspect of the present invention, there is provided an imaging method continuously opening a shutter a plurality of times and focusing incident light to a light receiving element by opening a shutter to generate image data, comprising a first step of opening the shutter in a state not emitting a flash to a subject to generate image data; a second step of opening the shutter in a state emitting a flash to the subject to generate image data continuing after the first step; a third step of applying first correction processing to the image data generated in the first step to generate first corrected image data and applying second correction processing different from the first correction processing to the image data generated in the second step to generate second corrected image data; and a fourth step of generating new image data based on the first corrected image data generated in the third step and the second corrected image data generated in the third step.

According to the present invention, therefore, an imaging device and an imaging method able to generate a high quality image even when emitting a flash when continuously imaging a plurality of times while continuously imaging a plurality of times can be provided.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

First Embodiment

Figure 1:
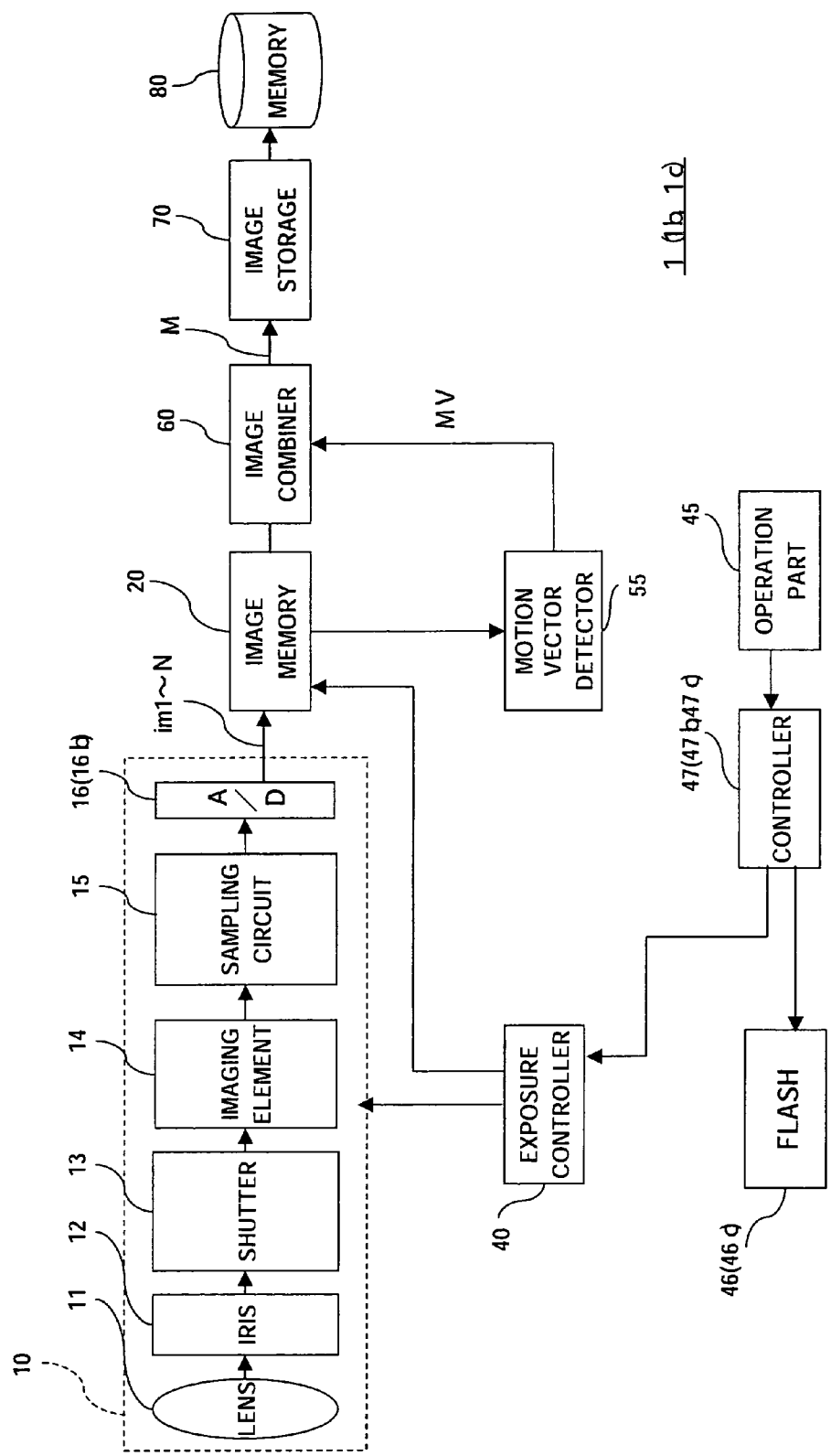
FIG. 1 is a view of the configuration of an imaging device of a first embodiment of the present invention.
Figure 2:
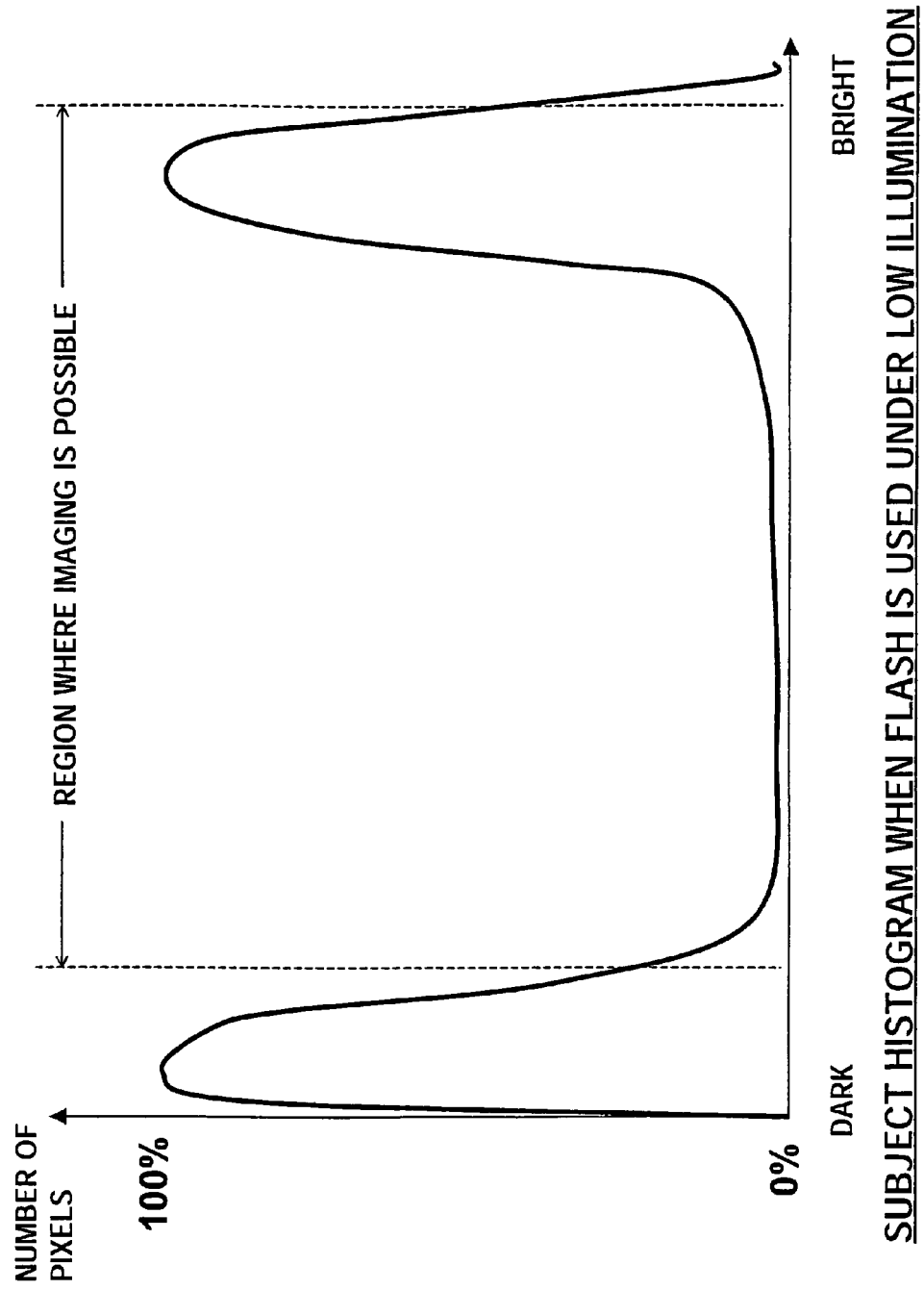
FIG. 2 is a diagram for explaining a subject histogram when using a flash under low illumination in a comparative example.
Figure 3:
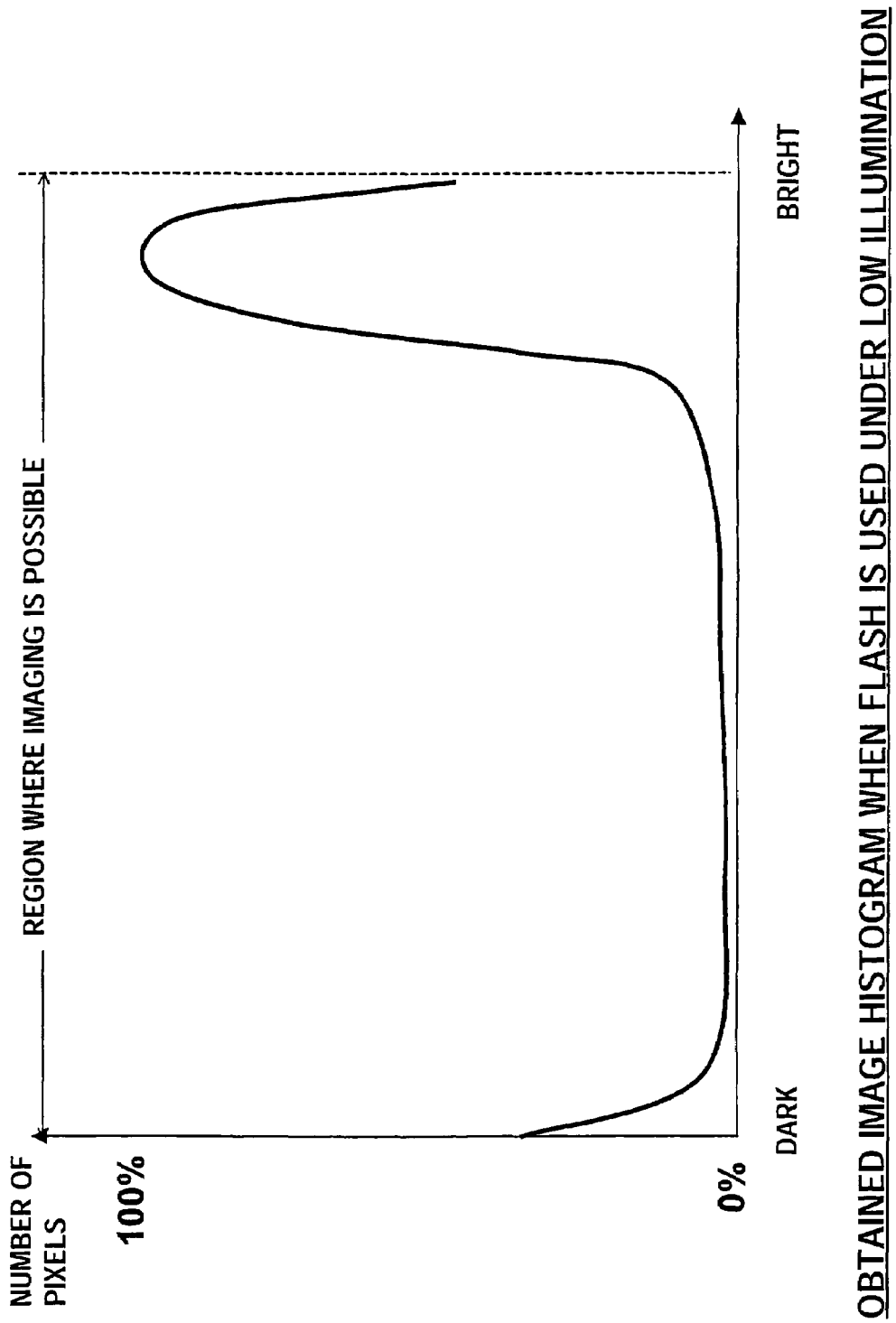
FIG. 3 is a diagram for explaining an image histogram when using a flash under low illumination in a comparative example.
Figure 4:
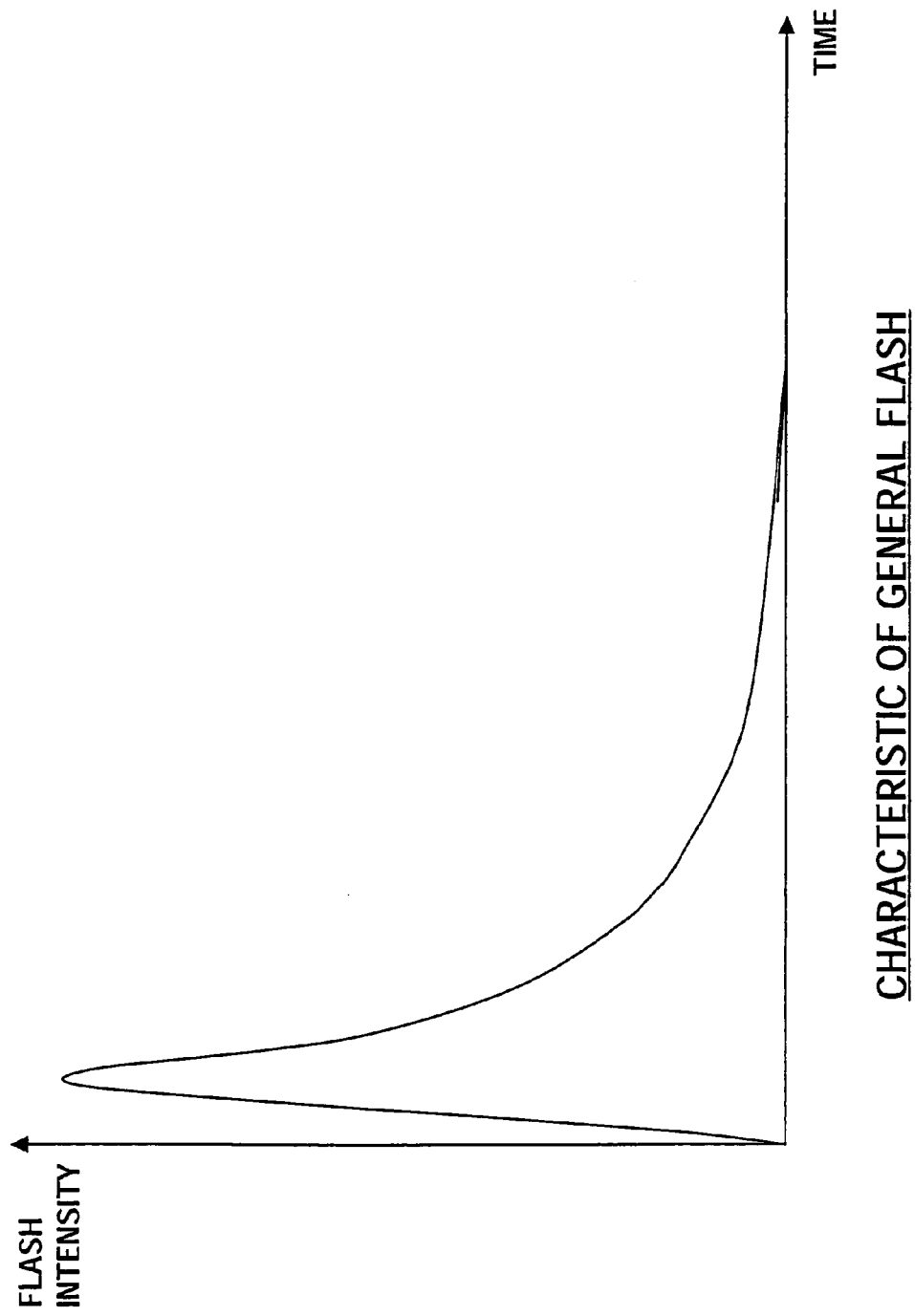
FIG. 4 is a diagram for explaining a general flash characteristic.
Figure 5:
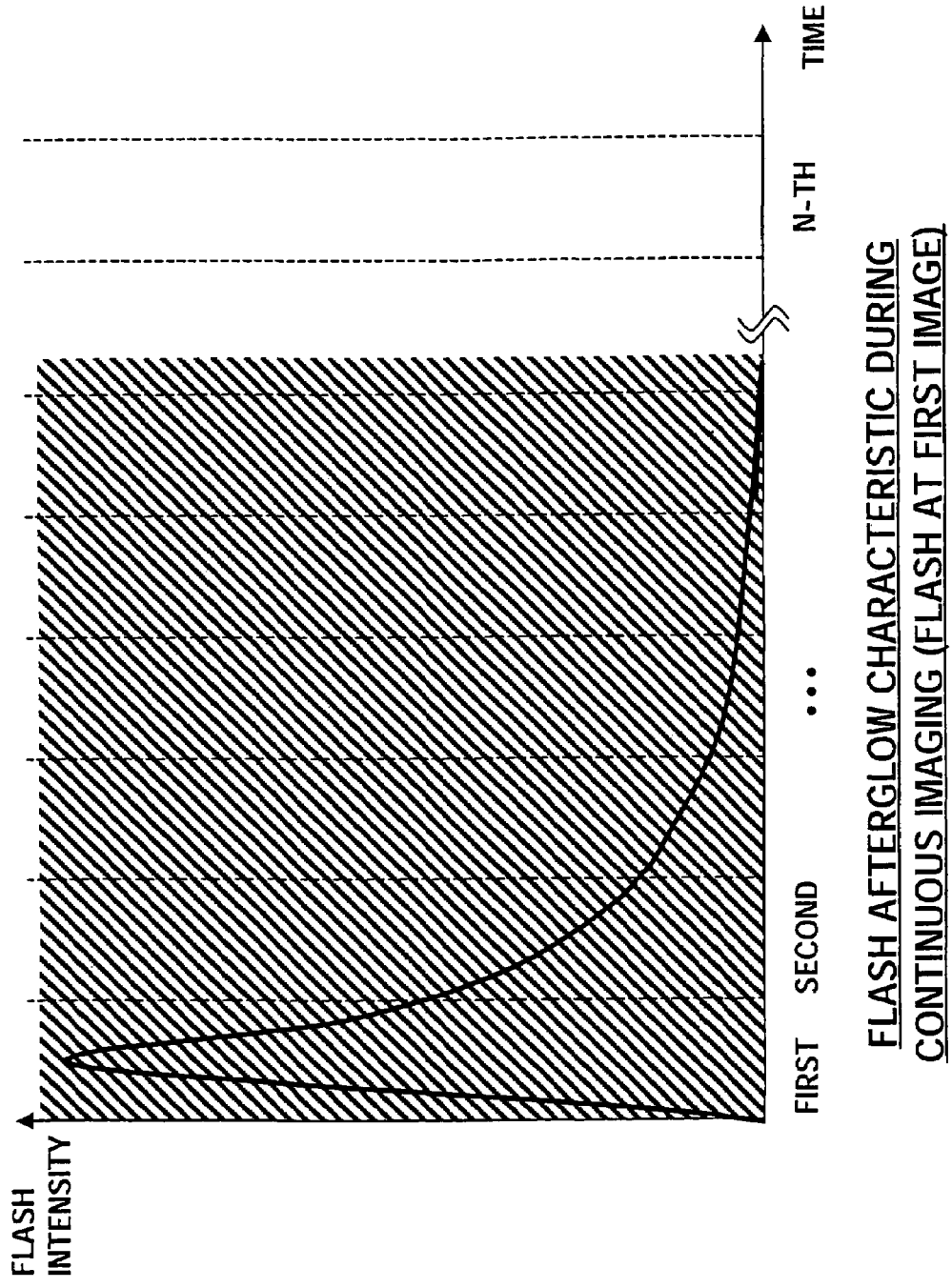
FIG. 5 is a diagram for explaining a flash afterglow characteristic during continuous imaging in a comparative example.

FIG. 1 is a view of the overall configuration of an imaging device 1 according to a first embodiment of the present invention. As shown in FIG. 1, the imaging device 1 has a camera module 10, an image memory 20, an exposure controller 40, an operation part 45, a flash 46, a controller 47, motion vector detector 55, an image combiner 60, and an image storage 70. In the imaging device 1, the exposure controller 40, the controller 47, the motion vector detector 55, and the image combiner 60 may be realized by either electronic circuits or a processor running a program.

Camera Module 10:

The camera module 10 has, for example a lens 11, an iris 12, a shutter 13, an imaging element 14, a sampling circuit 15, and an A/D conversion circuit 16. The lens 11 is struck by light from the imaging object and emits it to the iris 12. The iris 12 constricts the light incident from the lens 11 and emits it to the shutter 13. The shutter 13 opens for exactly a predetermined time (shutter time) under the control of the exposure controller 40. The shutter 13 focuses the light incident from the iris 12 to the imaging element 14 at the time of opening.

The imaging element 14 is configured using a charge coupled device (CCD), a complementary metal oxide semiconductor (CMOS), etc. and forms an image of (receives) the light of the subject incident via the shutter 13. The imaging element 14 converts the amount of the received light arriving at each light receiving element on the imaging plane to an electric signal by photoelectric conversion and outputs the image signal converted to the electric signal to the sampling circuit 15. The imaging element 14 is, for example, a single-plate sensor. Each electric signal output to the sampling circuit 15 is one color signal (data) among an R signal, a G signal, and a B signal per pixel.

In the imaging device 1, even when camera blurring occurs, in order to output a sharper image, the shutter 13 automatically opens at a higher speed (for a shorter shutter time) than the shutter speed at the right exposure (shutter time (exposure time)) and obtains a plurality of (hereinafter referred to as "N") images under the control of the exposure controller 40 when the shutter button of the operation part 45 is operated one time. The imaging device 1 obtains the N images at intervals of, for example, 1/30 second. Accordingly, the N images (input images) obtained by the imaging element 14 become darker (are photographed with an exposure less than the right exposure) than an image photographed with the right exposure and have brightnesses of 1/Mk (k=1 to N) of the image photographed with the right exposure. Note that the value of Mk is determined by, for example, the shutter speed.

The sampling circuit 15 eliminates the noise component of the image signal (electric signal) supplied from the imaging element 14 by, for example, correlated double sampling and supplies the resultant signal to the A/D conversion circuit 16. The A/D conversion circuit 16 performs the A/D conversion, that is, sampling and quantization, for the image signal input from the sampling circuit 15. Thereafter, the A/D conversion circuit 16 multiplies the dark image with the exposure less than the right exposure constituted by the image data after the A/D conversion by Mk by, for example, an n-bit shift by a built-in shift circuit to thereby convert the same to image data having the same brightness (value) as that by the right exposure (increase of gain) and writes the same into the image memory 20.

Exposure Controller 40:

The exposure controller 40 controls the shutter 13, the imaging element 14, the sampling circuit 15, the A/D conversion circuit 16, and the image memory 20 so as to obtain N images at predetermined time intervals indicated by the shutter time signal input from the controller 47.

Operation Part 45:

The operation part 45 is, for example, a shutter a button, button for setting the flash, or other operating means.

Flash 46:

The flash 46 emits a flash when receiving as input a flash signal from the controller 47. The flash 46 is arranged so as to emit a flash toward the imaging direction of the camera module 10.

Controller 47:

The controller 47 determines the shutter time based on the exposure information set by the user, matching with the brightness etc. of the subject, and outputs a shutter time signal indicating the shutter time to the exposure controller 40. Further, the controller 47 may automatically determine the shutter time based on the imaging result obtained by, for example, the camera module 10 obtaining a provisional image of the subject before the actual imaging. The provisional image is obtained when, for example, the user pushes the shutter button constituting the operation part 45 half way. Further, the controller 47 determines the shutter time for each of the N images described above and outputs a shutter time signal indicating this to the exposure controller 40.

Further, the controller 47 judges whether or not to emit a flash based on the above determined shutter time (exposure information) and the setting information set in accordance with the operation part 45 by the user. When judging to emit a flash, the controller 47 calculates the right shutter time for imaging and the number of images L in the state of not emitting a flash and the right shutter time for imaging and the number of images M in the state of emitting a flash. In the present embodiment, L+M=N is set.

Figure 7:
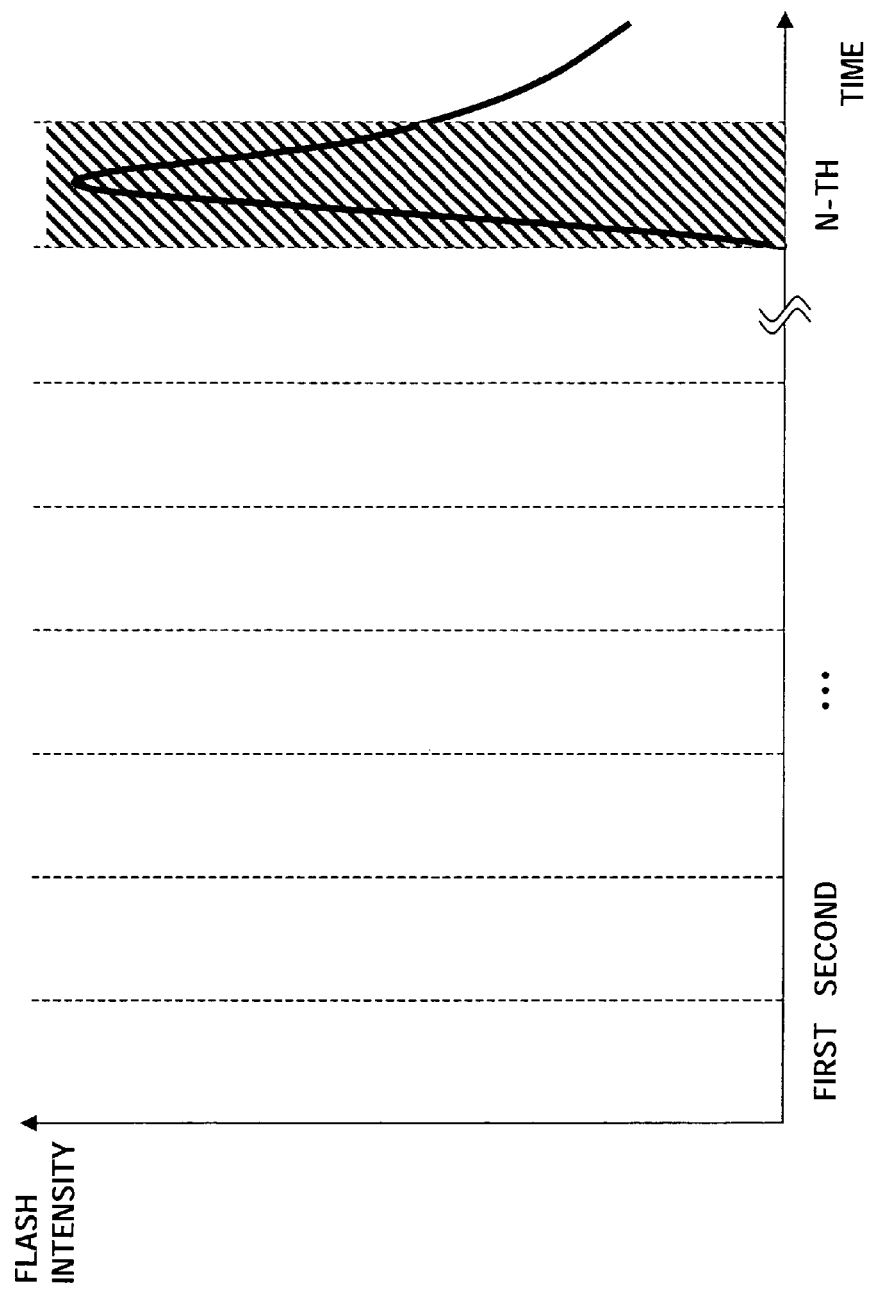
FIG. 7 is a diagram for explaining a flash timing of a flash shown in FIG. 1.

The controller 47 outputs a flash signal to the flash 46, so as to emit a flash at the second and following opening timings among the opening timings for continuously opening the shutter 13 N number of times. The controller 47, for example, as shown in FIG. 7, outputs the flash signal to the flash 46 to make it emit a flash at only the last (N-th) opening timing among the N opening timings. Due to this, the influence of the afterglow of the flash exerted upon the imaging occurs only at the N-th image, as shown in FIG. 7. Up to the N−1-th image, it becomes possible to obtain an image of a low luminance portion with no influence by the afterglow characteristic of the flash. Therefore, correction of the white balance, etc., is applied to only the N-th image, and it becomes possible to relatively easily apply correction before combining the images. For this reason, according to the present embodiment, by using the flash imaging and electronic hand blurring correcting means together, so-called slow synchro imaging is possible without the use of a tripod or other fixing means, and it becomes possible to easily obtain imaging results suppressing hand blurring.

Further, the controller 47 may calculate the insufficient amount of light from the already acquired exposure information, emit a preparatory flash in the provisional imaging, determine the amount of light of the flash based on the exposure information acquired based on the imaging result, and designate the same in the flash 46.

Motion Vector Detector 55:

The motion vector detector 55 reads out the N image data written in the image memory 20 by the series of imaging and detects motion vectors MV of these individual image data. The motion vector detector 55 outputs the detected motion vectors MV to the image combiner 60. The motion vector detector 55 performs the processing based on a time evaluation type optical flow method disclosed by, for example, Okada, Taniguchi, and Onoguchi in "Detection of Time Evaluation Type Optical Flow", *The IEICE Transactions*, D-II, No. 1, pp. 52-62, January 2003, the block matching method, etc. to generate the motion vectors MV.

Image Combiner 60:

The image combiner 60 reads out the N image data obtained by the series of imaging from the image memory 20 and corrects any positional deviation of the above N image data based on the motion vectors MV of the N image data input from the motion vector detector 55. Then, the image combiner 60 combines the N image data after being corrected for positional deviation to generate image data IM and outputs this to the image storage 70. The image storage 70 writes the image data IM input from the image combiner 60 into a memory 80. The memory 80 is a recording medium, such as a flash memory or a hard disk.

Figure 6:
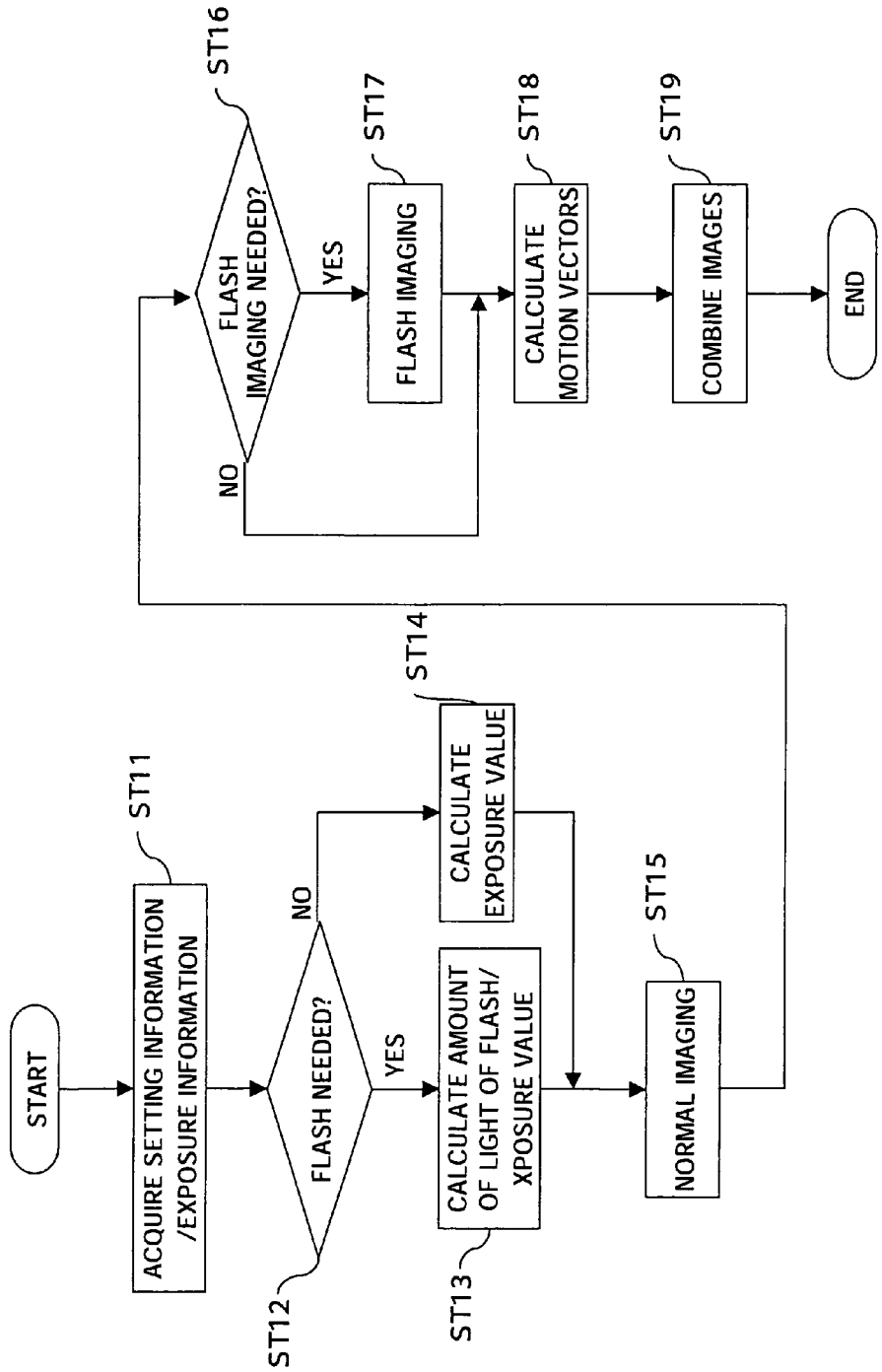
FIG. 6 is a flow chart for explaining an example of the operation of the imaging device shown in FIG. 1.

Below, an example of the operation of the imaging device 1 shown in FIG. 1 will be explained. FIG. 6 is a flow chart for explaining an example of the operation of the imaging device 1 shown in FIG. 1.

Step ST11:

The controller 47 receives input setting information set by the operation part 45, such as whether flash is required, and exposure information. Further, the controller 47 generates the exposure information based on the result of the provisional imaging when performing any provisional imaging.

Step ST12:

The controller 47 judges whether or not to emit a flash based on the setting information input at step ST11, the exposure information generated at step ST11, etc. The controller 47 proceeds to step ST13 when judging to emit a flash and proceeds to step ST14 when judging not to.

Step ST13:

The controller 47 determines the number of times L of the imaging during the non-flash period performed before the imaging during a flash and the shutter time (exposure value) at that time. Further, the controller 47 determines the number of times M of the imaging during the flash and the shutter time (exposure value) at that time. In the present embodiment, for example, M=1 is set.

Step ST14:

The controller 47 determines the number of times N of imaging when imaging with no flash and the shutter time (exposure time) at that time.

Step ST15:

The controller 47 outputs a shutter time signal indicating the number of times of imaging, i.e., L or M, and the shutter time during the non-flash period determined at step ST13 or ST14 to the exposure controller 40. The exposure controller 40 opens the shutter 13 by exactly the number of times of imaging L or N indicated by the shutter time signal input from the controller 47 at intervals of the shutter time indicated by the signal. Then, the image data obtained at the opening timings of the shutter 13 are sequentially written into the image memory 20.

Step ST16:

The controller 47 proceeds to step ST17 when judging to emit a flash at step ST12 and proceeds to step ST18 when judging not to emit a flash.

Step ST17:

The controller 47 outputs the flash signal to the flash 46. The flash 46 emits the flash toward the subject when receiving as input the flash signal from the controller 47. Further, at the timing when emitting the flash, under the control of the controller 47 and the exposure controller 40, the shutter 13 is opened by exactly the determined number of times of imaging, i.e., M, using the shutter time determined at step ST13 as the intervals. Then, the M image data obtained at the opening timings of the shutter 13 are sequentially written into the image memory 20.

Step ST18:

The motion vector detector 55 reads out the N image data written in the image memory 20 at steps ST15 and ST17 and detects the motion vectors MV of these individual image data. The motion vector detector 55 outputs the detected motion vectors MV to the image combiner 60.

Step ST19:

The image combiner 60 reads out the N image data written at steps ST15 and ST17 from the image memory 20 and corrects any positional deviation of the above N image data based on the motion vectors MV of the N image data input from the motion vector detector 55. Then, the image combiner 60 combines the N image data after being corrected for positional deviation to generate the image data IM and outputs this to the image storage 70. The image storage 70 writes the image data IM input from the image combiner 60 into the memory 80.

As described above, according to the imaging device 1, as shown in FIG. 7, the imaging is carried out (N−1) times before the flash, and the flash is emitted at the last N-th timing for the imaging. For this reason, in one series of N imaging, the occurrence of unnatural color elements in the image data obtained by imaging at the time of no flash due to the afterglow of the flash can be suitably avoided. Further, according to the imaging device 1, the plurality of image data obtained in the imaging at the time of no flash are corrected for positional deviation and combined, and therefore insufficient exposure of a low luminance image such as the background can be suitably compensated for without using a tripod or other fixing means. Further, according to the imaging device 1, the image data obtained by imaging at the time of a flash is further combined with the combined low luminance image, and therefore an image suitably displaying the foreground located at a distance reachable by the flash can be generated.

Second Embodiment

Figure 8:
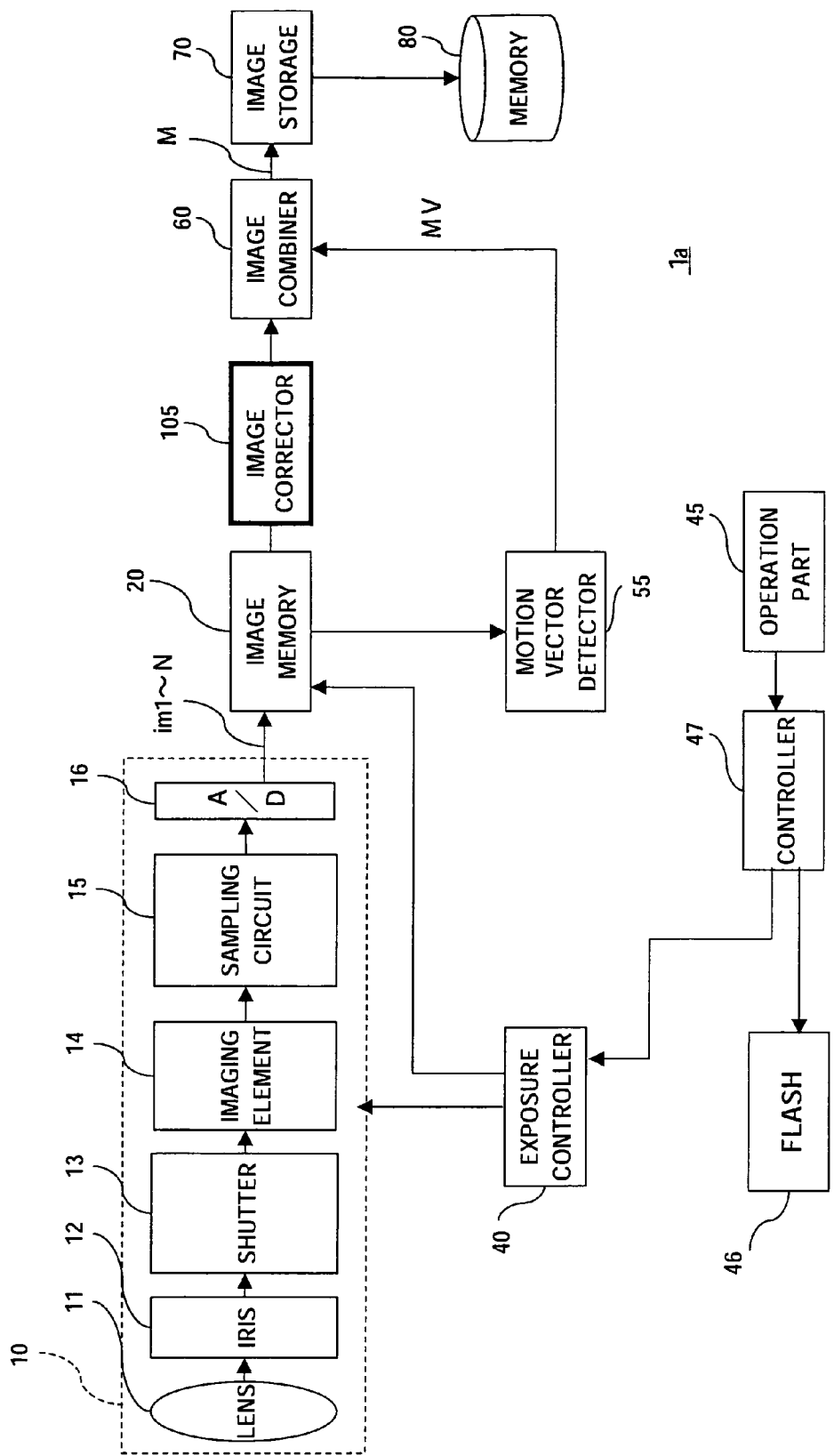
FIG. 8 is a view of the configuration of an imaging device of a second embodiment of the present invention.
Figure 9:
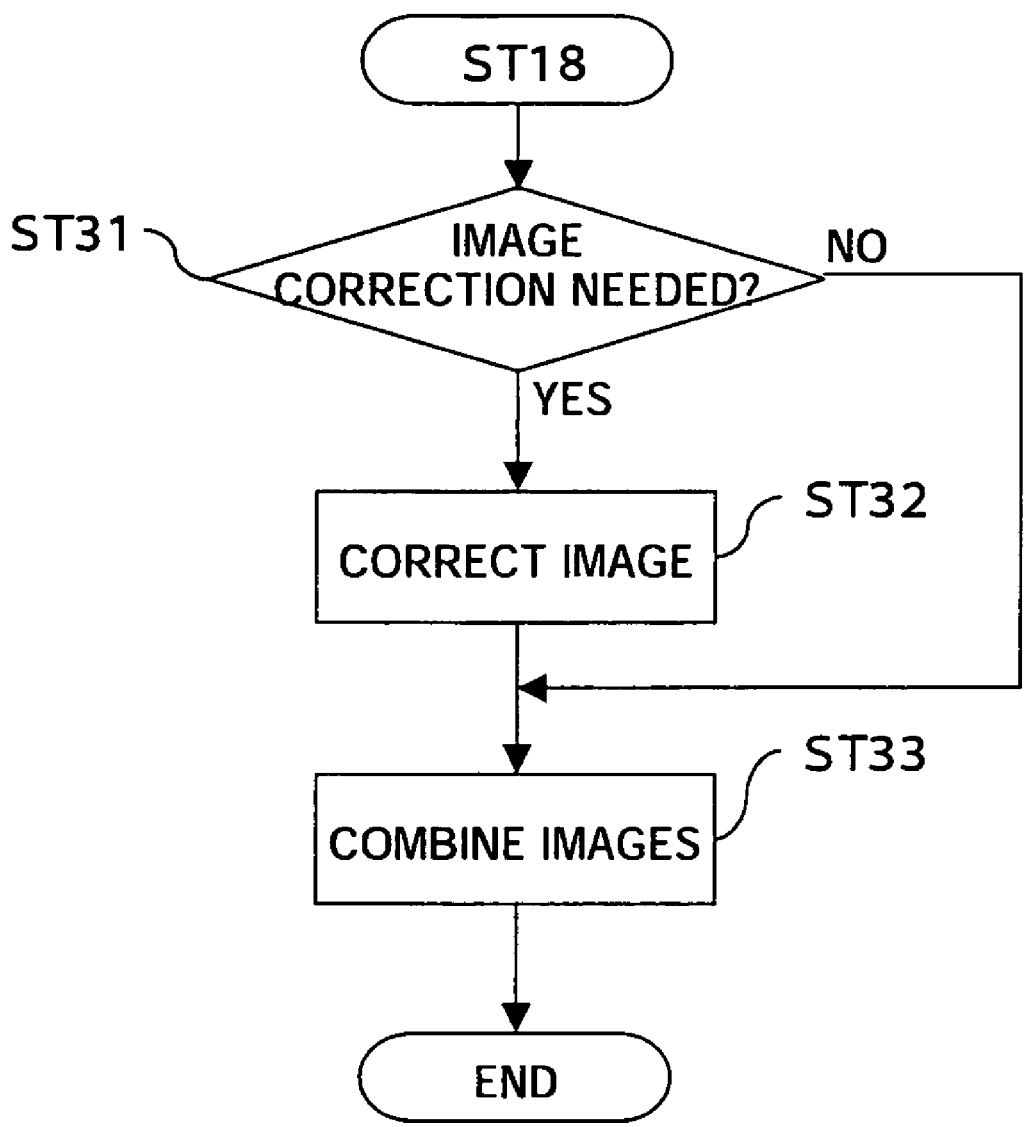
FIG. 9 is a flow chart for explaining an example of the operation of the imaging device shown in FIG. 8.

In the present embodiment, a case where the image data read out from the image memory 20 shown in FIG. 1 is processed for correction and then combined in the image combiner 60 will be explained. FIG. 8 is a view of the configuration of an imaging device 1a according to the second embodiment of the present invention. As shown in FIG. 8, the imaging device 1a is configured as the imaging device 1 shown in FIG. 1, wherein the image memory 20 and the image combiner 60 have an image corrector 105 provided between them. FIG. 9 is a flow chart for explaining the image correction processing and the combination processing of the imaging device 1a shown in FIG. 8. In FIG. 8, components given the same notations as those in FIG. 1 are basically the same as those explained in the first embodiment.

The image corrector 105 judges whether or not to correct the image in accordance with, for example, the imaging conditions previously set by the user (step ST31 in FIG. 9). Further, the image corrector 105 may judge the necessity of the correction based on the motion vectors MV detected by the motion vector detector 55 or may judge the necessity of the correction based on the exposure information generated or acquired by the controller 47. The image corrector 105 performs the correction processing of image data im1 to imN read out from the image memory 20 when judging that correction is necessary and outputs the result to the image combiner 60 (step ST32). The image corrector 105 performs the processing of any combination of, for example, gain adjustment of the image data, γ-curve characteristic adjustment, and white balance adjustment as the correction processing. The image corrector 105 corrects the gain of the L image data obtained without flash among, for example, the obtained N image data so as to increase the overall brightness and simultaneously corrects the γ-curve attaching importance to the halftones of the low luminance portion. On the other hand, the image corrector 105 does not correct the brightness of the M images obtained along with a flash, but it corrects the γ-curve attaching importance to the halftones of the intermediate luminance portion and adjusts the white balance suitably for the flash source. Namely, the image corrector 105 can perform any correction with respect to any image data irrespective of the relationships between image data. Further, the image corrector 105 may perform the correction processing after combining the image data obtained without flash for the L images, perform the correction processing after combining the image data obtained along with a flash for the M images, and then combine the corrected combined images.

Figure 10:
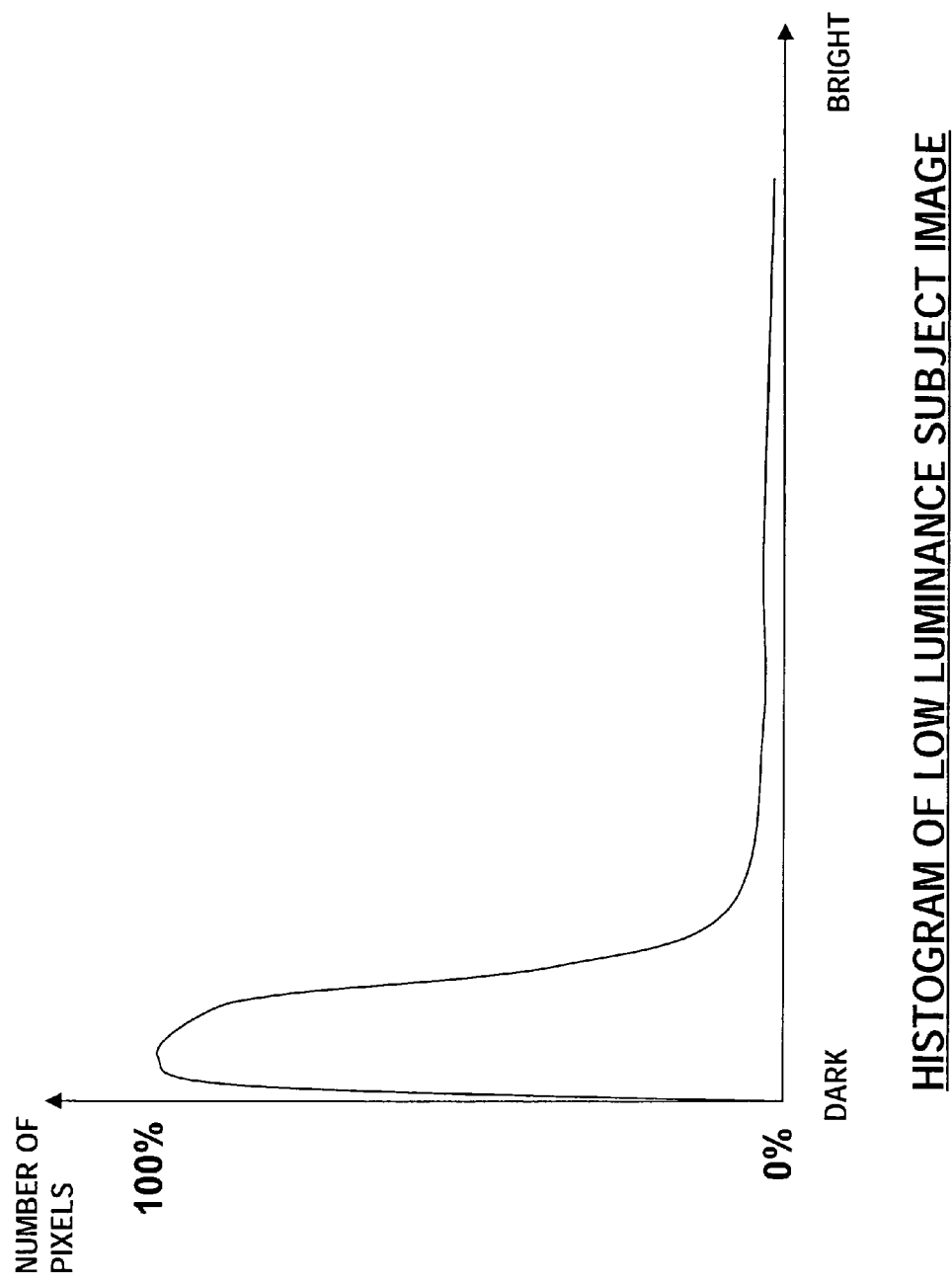
FIG. 10 is a diagram for explaining a histogram of a low luminance subject image.
Figure 11:
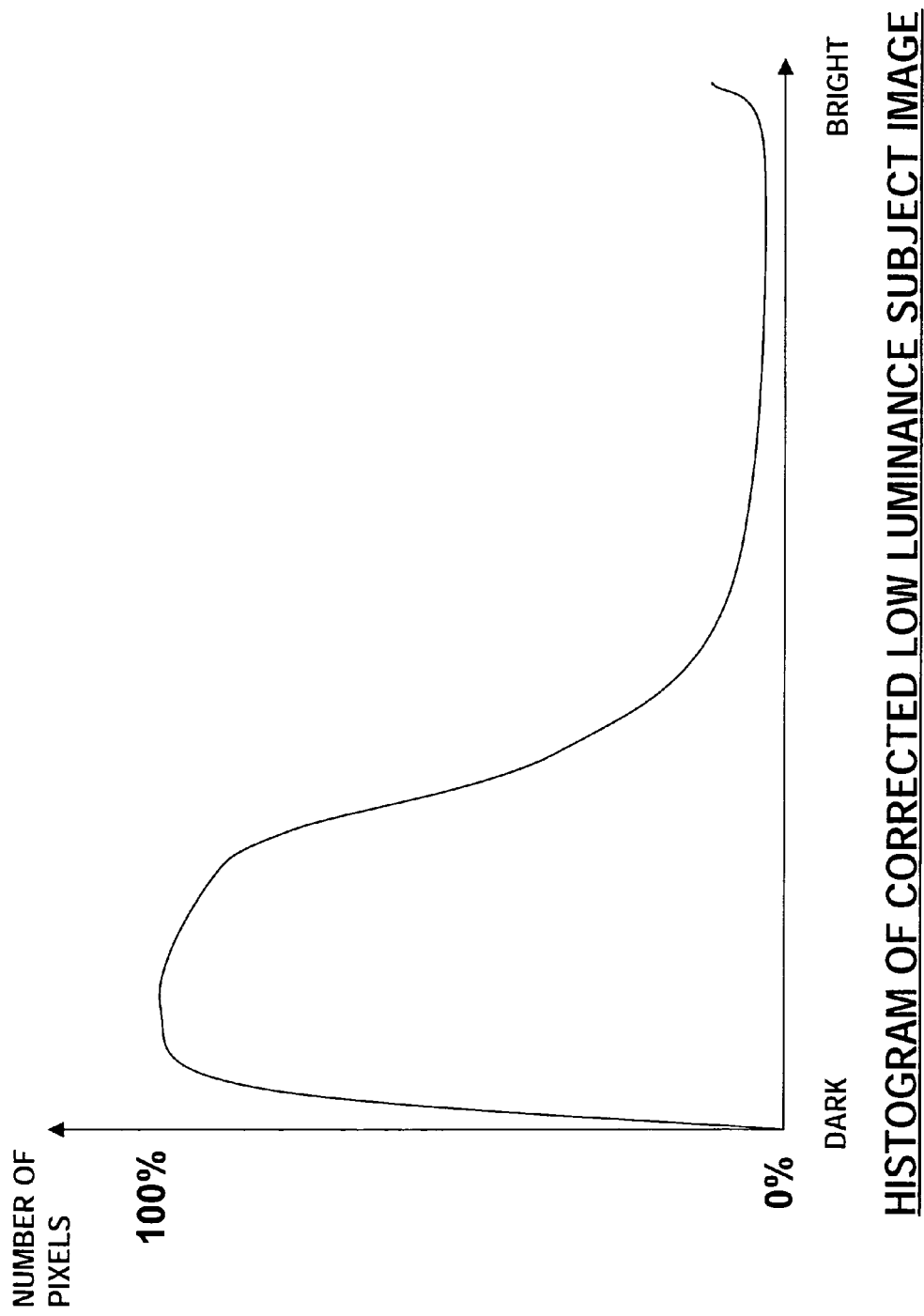
FIG. 11 is a diagram for explaining a histogram of a low luminance subject image after correction.
Figure 12:
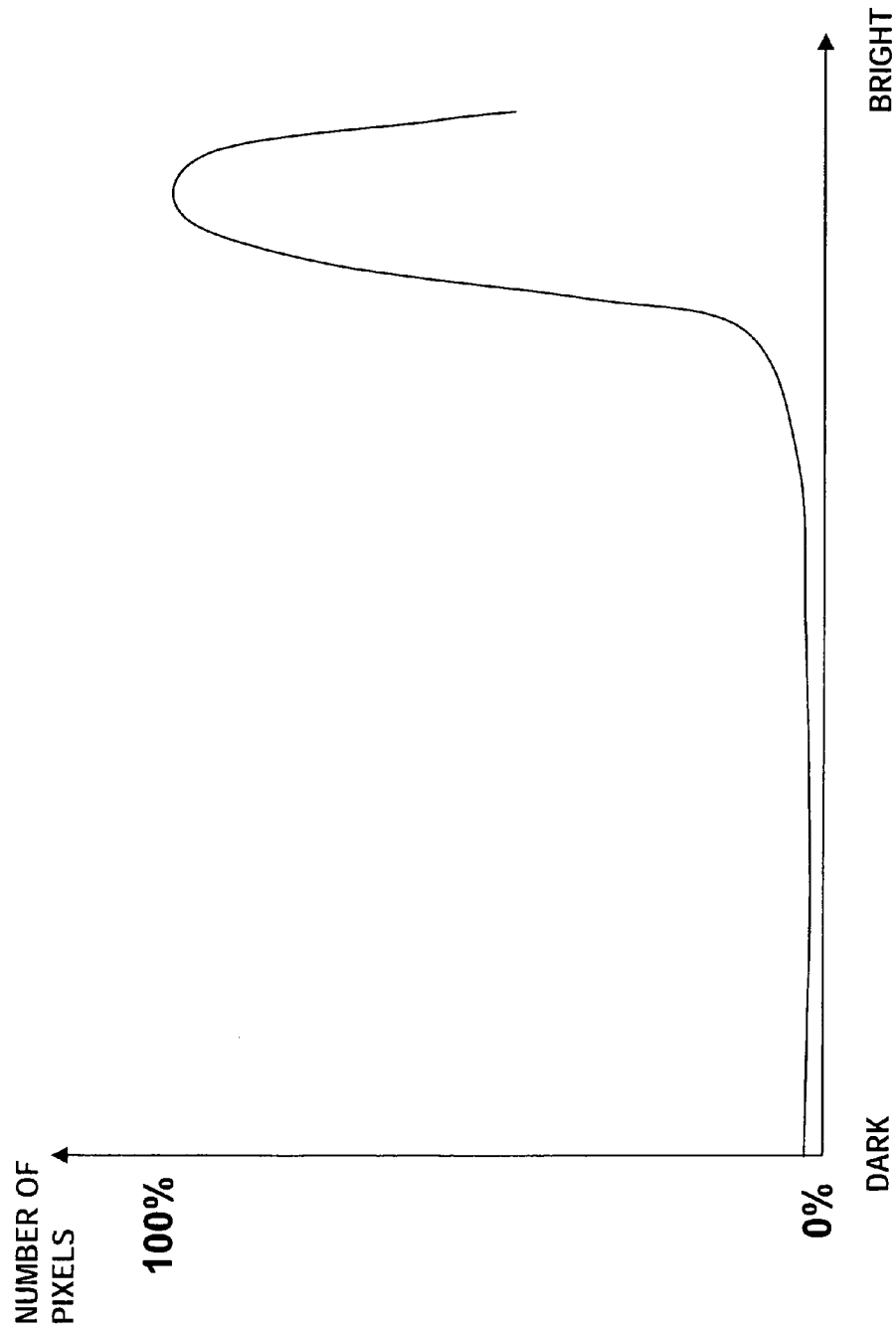
FIG. 12 is a diagram for explaining a histogram of an image obtained in flash imaging.
Figure 13:
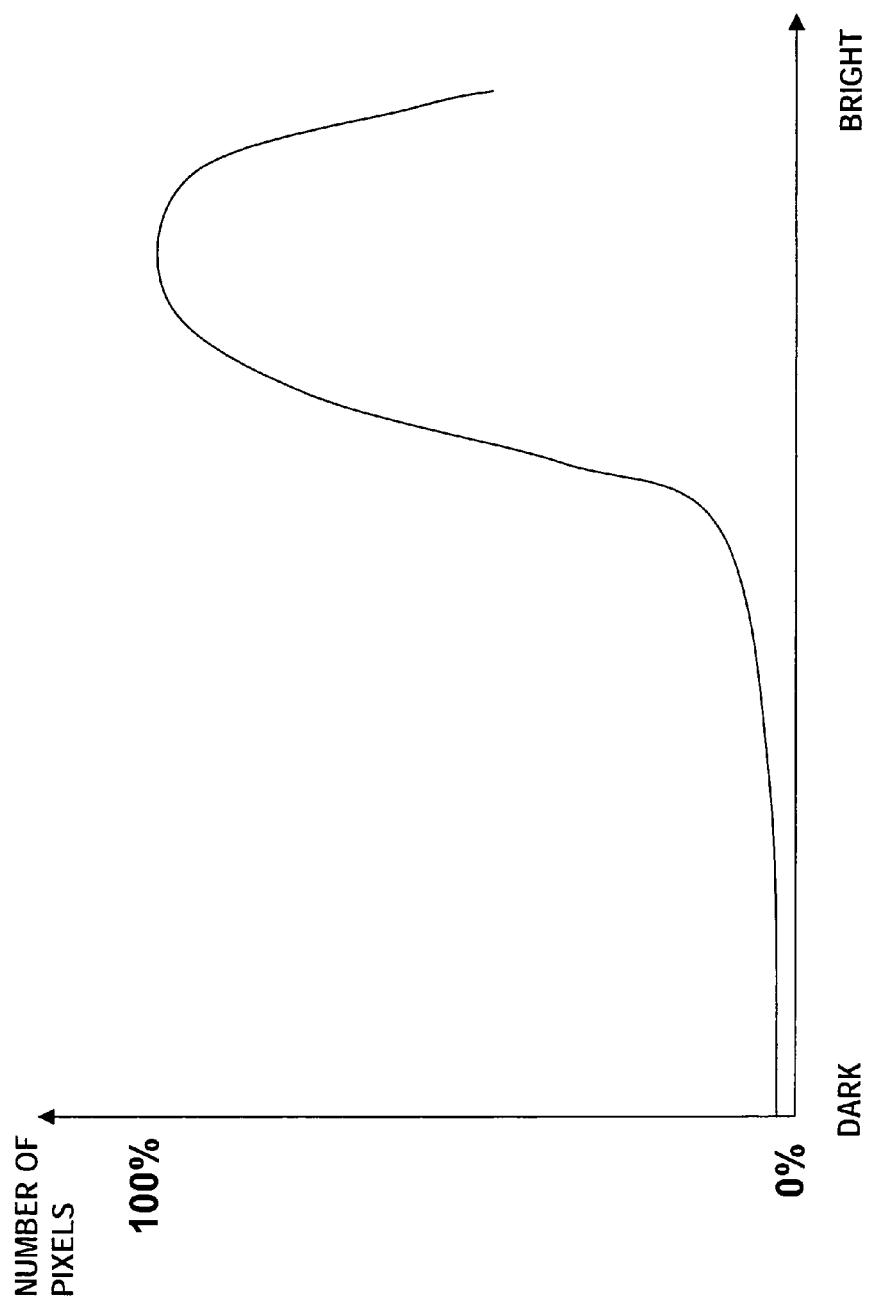
FIG. 13 is a diagram for explaining a histogram of an image after a correction obtained in flash imaging.

When the image corrector 105 adjusts the gain of, for example, both the image of the low luminance portion and the flash image, the image of the low luminance portion has a histogram characteristic biased to the low luminance region as shown in FIG. 10. In the histograms of FIG. 10 to FIG. 14, the abscissa indicates the luminance, and the ordinate indicates the number of pixels. When applying image correction for raising the gain to the image of FIG. 10, a histogram characteristic in which the low luminance region is spread to the high luminance side is exhibited as shown in FIG. 11. Further, the flash image has a histogram characteristic biased to the high luminance region as shown in FIG. 12. When applying image correction for lowering the gain to this, the obtained image has a histogram characteristic in which the high luminance region is spread to the low luminance side as shown in FIG. 13.

Figure 14:
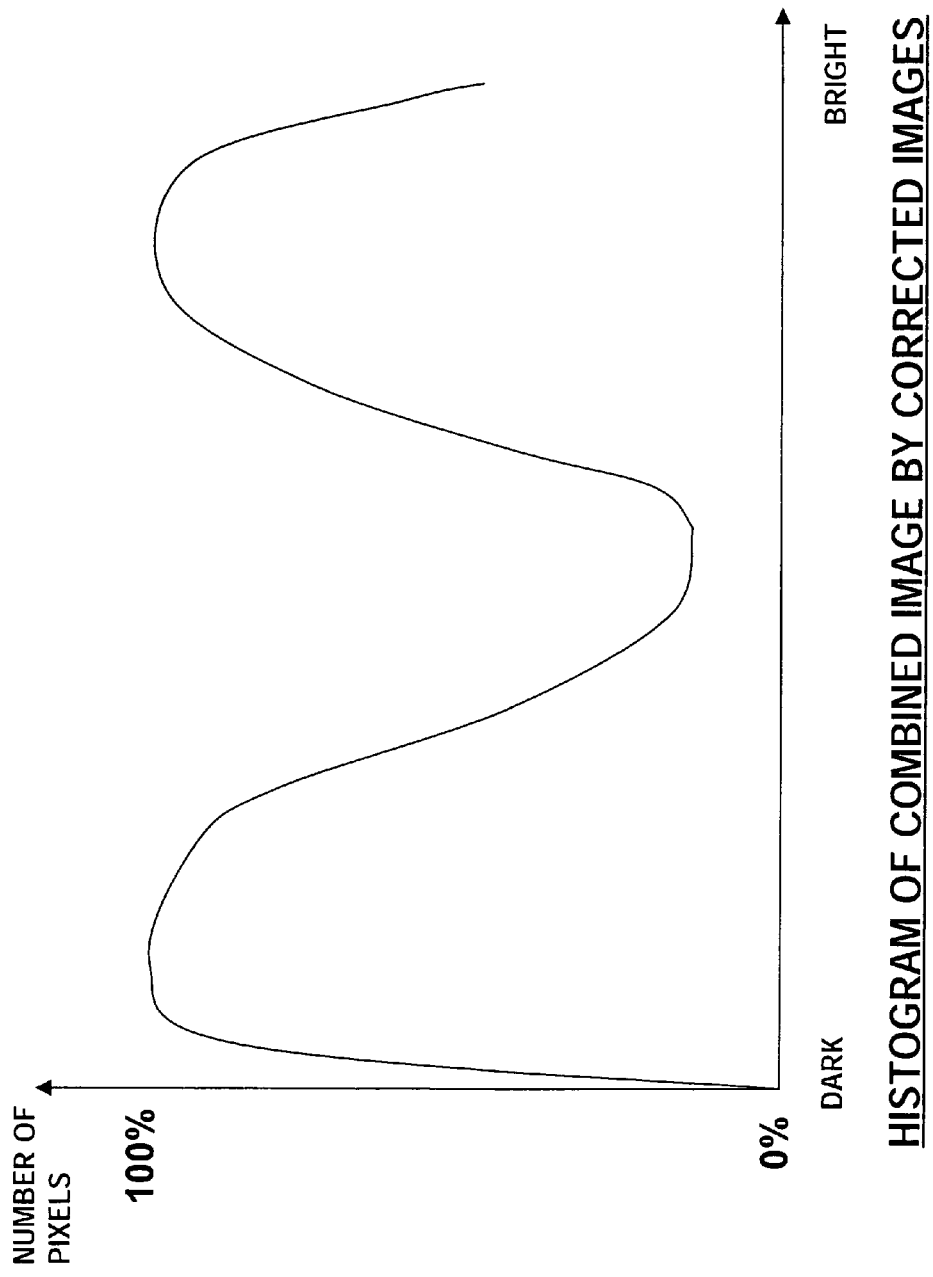
FIG. 14 is a diagram for explaining a combined image of the image after the correction of FIG. 11 and the image after the correction of FIG. 13.

The image combiner 60 combines the image data im1 to imN corrected at the image corrector 105 after correction of the positional deviation based on the motion vectors MV from the motion vector detector 55 to generate the image data IM (step ST33 shown in FIG. 9). On the other hand, when judging that correction is not necessary at step ST31 shown in FIG. 9, the image corrector 105 performs the same processing as that in the first embodiment, that is, it combines the image data im1 to imN read out from the image memory 20 to generate the image data IM. Due to this, the image data IM generated by the image combiner 60 has histogram characteristics effectively utilizing the dynamic range of the imaging element as shown in FIG. 14, so it becomes possible to generate a image having rich halftones in each of the low luminance portion and the flash image and having the dynamic range of the imaging element.

As described above, according to the present embodiment, it becomes possible to apply the optimum image correction to the image data obtained under different conditions before combining them and to obtain a photograph in which the optimum image correction is applied to each of the plurality of subjects in the image without using image recognition or other complex and expensive means.

Third Embodiment

Figure 15:
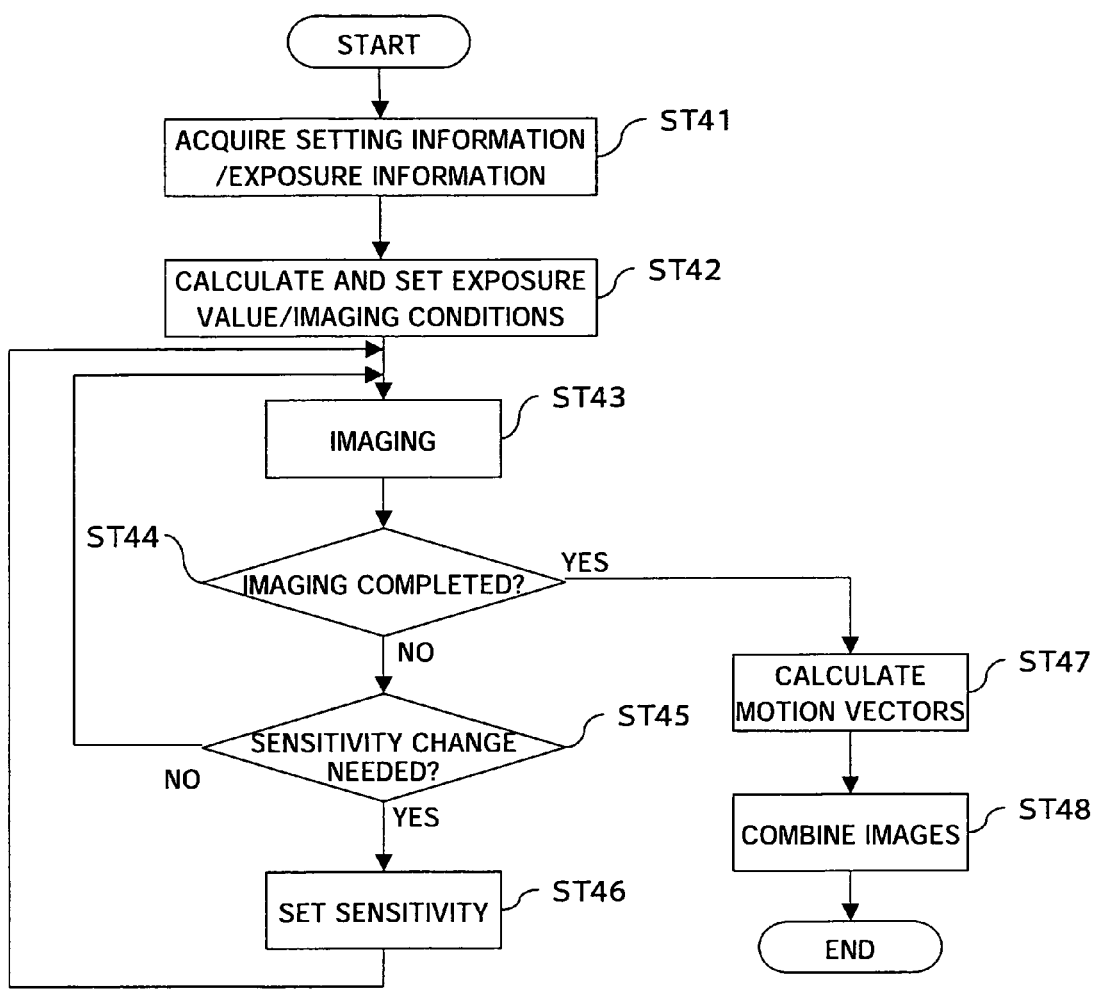
FIG. 15 is a diagram for explaining an example of the operation of an imaging device of a third embodiment of the present invention.

An imaging device 1b of the present embodiment is the same as the imaging device 1 shown in FIG. 1, except for the processing of an A/D conversion circuit 16b and a controller 47b. FIG. 15 is a flow chart for explaining an example of the operation of the imaging device 1b of the present embodiment.

Step ST41:

The controller 47b of the imaging device 1b shown in FIG. 1 receives the exposure information of the imaging object from the camera module 10 and the imaging condition information set by the user operating the operation part 45 as input.

Step ST42:

The controller 47b determines, for example, the shutter time and the necessity of the flash in the same way as the first embodiment based on the exposure information and the imaging condition information input at step ST41. At this time, the controller 47b determines the shutter time and the necessity of the flash luminescence for each of the N opening timings (imaging) explained in the first embodiment.

Step ST43:

The controller 47b performs the first imaging among the N imaging based on the matter determined at step ST42. When emitting a flash according to previously determined conditions, the controller 47b outputs a flash signal to the flash 46. Due to this, the light of the subject is focused on the imaging element 14, and an analog image signal in accordance with the result is output to the sampling circuit 15. Then, the sampling circuit 15 samples the input analog image signal and converts it to digital image data in the A/D conversion circuit 16b. At this time, the A/D conversion circuit 16b raises or lowers the gain of the converted digital image data by shift processing, etc., as explained in the first embodiment, based on a sensitivity control signal from the controller 47b. Due to this, the de facto light reception sensitivity of the imaging element 14 is controlled. The image data generated by the A/D conversion circuit 16b is written into the image memory 20.

Step ST44:

The controller 47b judges whether or not the above mentioned N imaging has ended, proceeds to step ST47 when judging it has ended, and proceeds to step ST45 when judging it has not ended.

Step ST45:

The controller 47b judges whether or not a change of the light reception sensitivity of the imaging element 14 is needed, proceeds to step ST46 when judging that a change is needed, and returns to step ST43 when judging that has not needed. The controller 47b judges the necessity of the change of the light reception sensitivity based on the imaging conditions previously set by the user and the information etc. acquired at step ST41.

Step ST46:

The controller 47b example decides to set the light reception sensitivity of the imaging element 14 to high (adjusts the amount of shift of the shift processing to raise the gain) when next performing imaging not accompanied by a flash and to set the light reception sensitivity of the imaging element 14 to low when next performing imaging accompanied by a flash. Due to this, it becomes possible to obtain an image having a high S/N ratio.

Step ST47:

The motion vector detector 55 reads out N image data written in the image memory 20 at step ST43 and detects the motion vectors MV of these individual image data. The motion vector detector 55 outputs the detected motion vectors MV to the image combiner 60.

Step ST48:

The image combiner 60 reads out N image data written at step ST43 from the image memory 20 and corrects the positional deviations of the above N image data based on the motion vectors MV of the N image data input from the motion vector detector 55. Then, the image combiner 60 combines the N image data after correction of the positional deviation to generate the image data IM and outputs it to the image storage 70. The image storage 70 writes the image data IM input from the image combiner 60 into the memory 80.

As described above, according to the present embodiment, it becomes possible to change the sensitivity setting of the imaging element during continuous imaging, a variety of imaging conditions can be handled, and it becomes possible to perform the imaging by making the best use of the capabilities of the imaging element under any imaging conditions.

Fourth Embodiment

Figure 17:
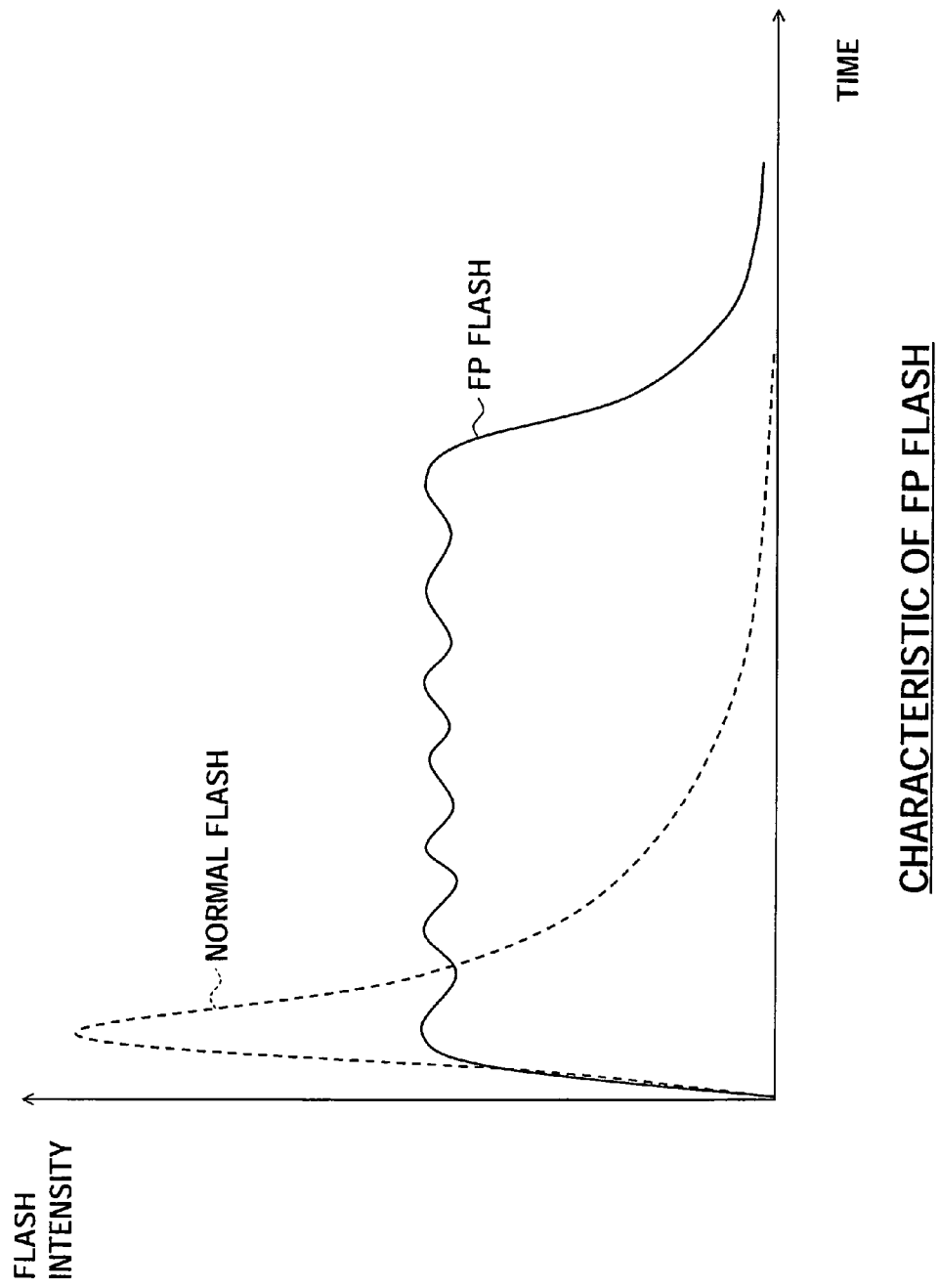
FIG. 17 is a diagram for explaining a focal plane flash characteristic in a fourth embodiment of the present invention.

An imaging device 1c of the present embodiment is the same as the imaging device 1 shown in FIG. 1, except for the processing of a flash 46c and a controller 47c. The flash 46c is provided with a focal plane (FP) flash function. Here, an "FP flash" is a function of synchronization with a speed of over the strobe sync speed in a single lens reflex camera employing an FP shutter. Usually, due to the structure of the shutter, there is a limit to the strobe sync speed. This is roughly about 1/60 to 1/250. When the speed is more than this, the shutter will not completely open, and therefore the light of the strobe will be bounced back and a dark portion in a form of a slit will end up being formed. Therefore, by operating the strobe for a long time (more precisely speaking, operating the strobe many times at a high speed), the entire time from when the shutter opens to when it closes is covered, and thereby synchronization at all speeds becomes possible. The flash 46c repeatedly flashes for short times by, for example, tuning on/off the flash so as to continuously emit a flash with a substantially constant flash intensity by high speed switching as shown in FIG. 17.

Figure 16:
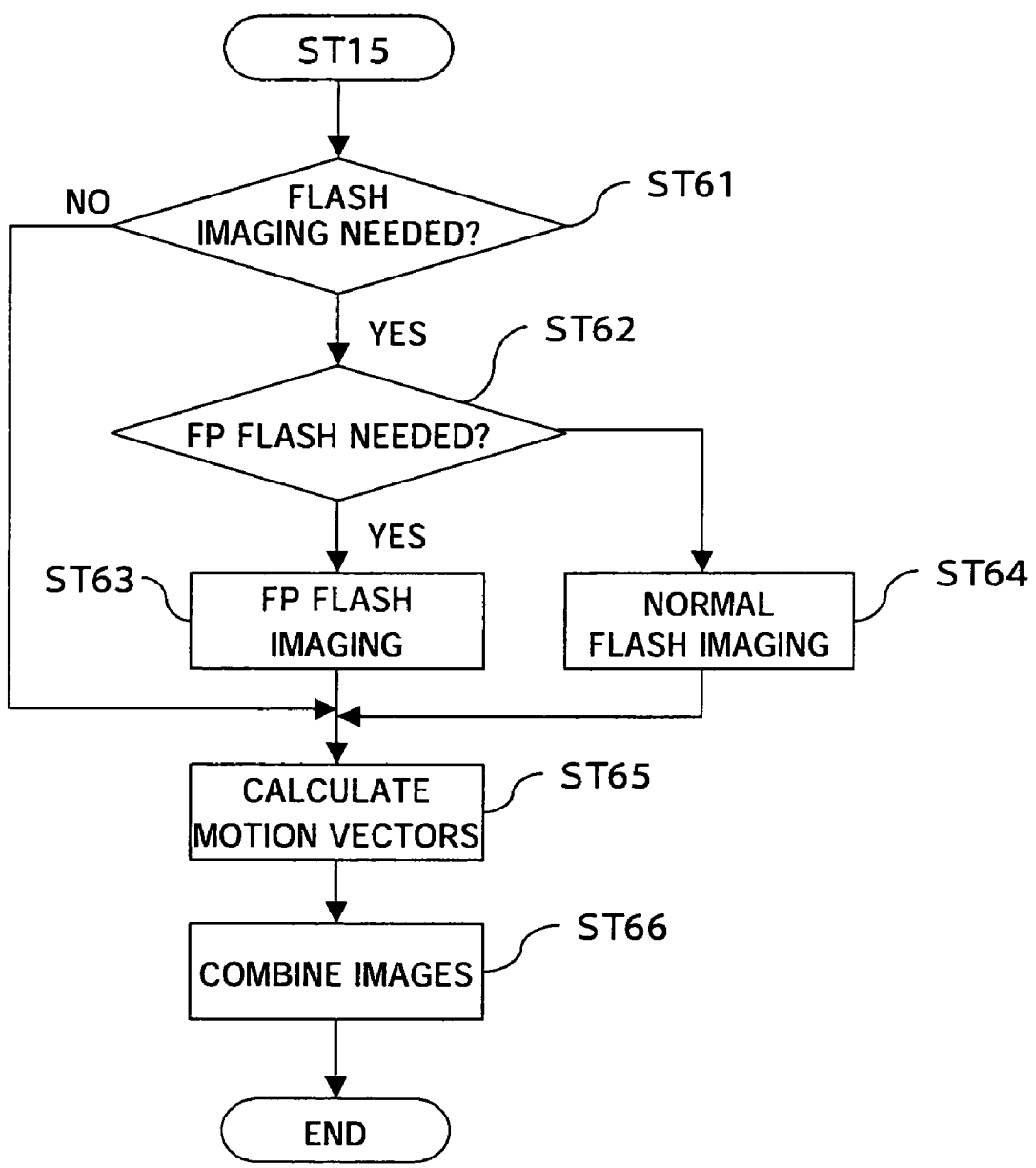
FIG. 16 is a diagram for explaining an example of the operation of an imaging device of a fourth embodiment of the present invention.

FIG. 16 is a flow chart for explaining an example of the operation of the imaging device 1c of the present embodiment.

Step ST61:

The controller 47c executes step ST61, continuing after step ST15 shown in FIG. 6 and explained in the first embodiment. The controller 47c proceeds to step ST62 when judging to emit a flash at step ST12 shown in FIG. 6, while it proceeds to step ST65 when judging not to emit a flash.

Step ST62:

The controller 47c judges the necessity of a FP flash. The controller 47c judges that an FP flash is needed in, for example, a case where the shutter speed determined at step ST13 shown in FIG. 6 is higher than the shutter sync speed or a case where slow synchro imaging is designated under the imaging conditions set by the user operating the operation part 45 shown in FIG. 1. The controller 47c proceeds to step ST63 when judging that an FP flash is needed, while it proceeds to step ST64 when judging that a FP flash is not needed.

Figure 18:
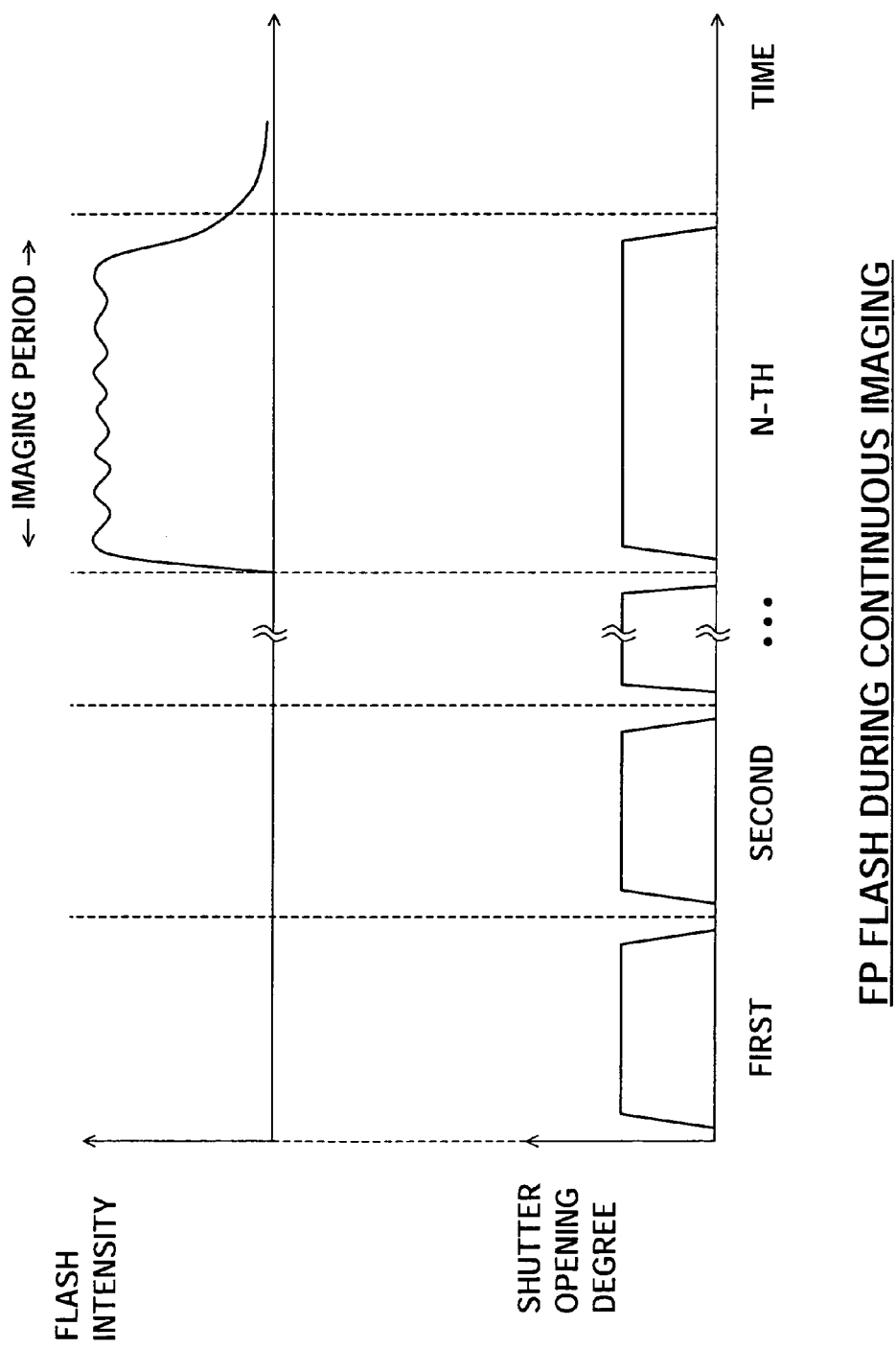
FIG. 18 is a diagram for explaining a timing of a focal plane flash during continuous imaging in the fourth embodiment of the present invention.

Step ST63:

The controller 47c outputs as flash signal indicating FP flash to the flash 46c. Due to this, the flash 46c emits the FP flash in a predetermined imaging among the N imaging. The controller 47c makes the flash 46c emit an FP flash at, for example, the N-th timing among the N imaging as shown in FIG. 18. At this time, in the imaging at the N-th timing, the shutter speed is made higher than the speed at the time of normal flash, for example, 1/250. Due to this, the imaging can be carried out in a substantially still state even for a subject having movement. For example, a subject having movement in front of the background can be clearly photographed while photographing the background at night. On the other hand, when the N-th timing imaging is set to a low shutter speed of, for example, 1/30, a subject having movement in front of the background is photographed as if it were flowing, so a subject having movement can be photographed in a manner expressing the feeling of motion while photographing the background at night. Note that the controller 47c can also control the flash 46c so as to emit an FP flash in all of the above N imaging or may control the flash 46c so as to emit the FP flash in the imaging of a few times before the last timing among the N imaging.

Step ST64:

The controller 47c outputs, for example, the flash signal to the flash 46c in the same way as step ST17 shown in FIG. 6 of the first embodiment. The flash 46c emits a flash in response to the flash signal. Further, the subject is photographed in the same way as the first embodiment during the flash.

Step ST65:

The motion vector detector 55 reads out the N image data written in the image memory 20 by the imaging at step ST15 shown in FIG. 6 and steps ST63 and ST64 shown in FIG. 16 and detects the motion vectors MV of the individual image data. The motion vector detector 55 outputs the detected motion vectors MV to the image combiner 60.

Step ST66:

The image combiner 60 reads out N image data written in the image memory 20 by the imaging at step ST15 shown in FIG. 6 and steps ST63 and ST64 shown in FIG. 16 from the image memory 20 and corrects any positional deviations of the N image data based on the motion vectors MV of the N image data input from the motion vector detector 55. Then, the image combiner 60 combines the N image data after correction of the positional deviations to generate the image data IM and outputs this to the image storage 70. The image storage 70 writes the image data IM input from the image combiner 60 into the memory 80.

As described above, according to the present embodiment, it becomes possible to perform high speed synchro imaging or slow synchro imaging using an electronic hand blurring correcting means together. For example, it becomes possible to photograph an image of a rotating object under low illumination while including also the peripheral low luminance portion while leaving the feeling of motion or to photograph an image of an object moving at a high speed while including also the peripheral low luminance portion without flowing of the image.

The present invention is not limited to the above embodiments. Namely, a person skilled in the art may make a variety of modifications, combinations, sub-combinations, and alterations with respect to the components of the embodiments described above within the technical range of the present invention or equivalent range. For example, in the above embodiments, as shown in FIG. 7 etc., the case where N number of continuous images were obtained by one operation of the shutter button and where the flash 46 was made to flash in the last imaging thereof (N-th timing) was exemplified, but as long as the flash is emitted at the second or later imaging, there is the effect that at least the imaging before the flash will not be affected by the afterglow of the flash.

What we claim is:

1. An imaging device comprising:
    an imaging means for focusing incident light to a light receiving element by shutter opening to generate image data;
    a flash means for emitting a flash toward an imaging direction of the imaging means;
    a controlling means for controlling the imaging means so as to continuously open the shutter a plurality of times and controlling the flash means so as to emit a flash at a second and following opening timings among the plurality of opening timings; and
    an image processing means for generating new image data based on the image data generated by the imaging means by the imaging at the opening timing when the flash means does not emit a flash and the image data generated by the imaging means by the imaging at the opening timing when the flash means emits a flash.

2. The imaging device as set forth in claim 1, wherein said device further has a motion vector detecting means for detecting motion vectors of said plurality of image data generated by imaging by said imaging means at said plurality of consecutive opening timings of said shutter, and
    said image processing means corrects any positional deviation of said plurality of image data based on said motion vectors detected by said motion vector detecting means, then combines the data to generate said new image data.

3. The imaging device as set forth in claim 1, wherein said image processing means generates said new image data based on combined image data obtained by combining a plurality of image data generated by said imaging means by said imaging at said opening timings when said flash means is not emitting a flash and said image data generated by said imaging means by said imaging at said opening timing when said flash means is emitting a flash.

4. The imaging device as set forth in claim 1, wherein:
    said device further has a correcting means for applying first correction processing to the first image data generated by the imaging means by said imaging during no flash to generate first corrected image data and applying second correction processing different from the first correction processing to the second image data generated by the imaging means by said imaging during a flash to generate second corrected image data; and
    said image processing means generates said new image data based on the first corrected image data and the second corrected image data generated by correction by the correcting means.

5. The imaging device as set forth in claim 4, wherein said correcting means performs said first correction processing to raise a gain of said first image data and performs said second correction processing to lower a gain of said second image data.

6. The imaging device as set forth in claim 1, wherein said controlling means controls said imaging means so as to open said shutter for exactly a first time at a timing for not emitting said flash and to open said shutter by exactly a second time at a timing for emitting said flash.

7. The imaging device as set forth in claim 1, wherein said controlling means switches a light receiving sensitivity of a light receiving element of said imaging means to be different between a timing for emitting said flash and a timing for not emitting said flash.

8. The imaging device as set forth in claim 1, wherein said controlling means controls said flash means so as to emit said flash in an FP mode when making said shutter of said imaging means perform a focal plane operation at a timing of emission of said flash.

9. The imaging device as set forth in claim 1, wherein said controlling means controls said flash means so as to emit said flash at a final opening timing among said plurality of opening timings.

10. The imaging device as set forth in claim 1, wherein:
    the device further has an operating means for a user to input a still image capture instruction by a single operation; and said controlling means controls said imaging means so as to open said shutter consecutively a plurality of times when said operating means inputs said still image capture instruction.

11. An imaging device comprising:

an imaging means for focusing incident light to a light receiving element by shutter opening to generate image data;

a flash means for emitting a flash toward an imaging direction of the imaging means;

a controlling means for controlling the imaging means so as to continuously open the shutter a plurality of times and controlling the flash means so as to emit the flash at any opening timing among the plurality of opening timings;

a correcting means for applying first correction processing to the first image data generated by the imaging means by the imaging during no flash to generate first corrected image data and applying second correction processing different from the first correction processing to the second image data generated by the imaging means by the imaging during a flash to generate second corrected image data; and an image processing means for generating new image data based on the first corrected image data and the second corrected image data generated by correction by the correcting means.

12. An imaging method continuously opening a shutter a plurality of times and focusing incident light to a light receiving element by shutter opening to generate image data, comprising:

a first step of opening the shutter in a state not emitting a flash to a subject to generate image data;

a second step of opening the shutter in a state emitting a flash to the subject to generate image data continuing after the first step; and a third step of generating new image data based on the image data generated by the imaging in the first step and the image data generated by the imaging in the second step.

13. An imaging method continuously opening a shutter a plurality of times and focusing incident light to a light receiving element by shutter opening to generate image data, comprising:

a first step of opening the shutter in a state not emitting a flash to a subject to generate image data;

a second step of opening the shutter in a state emitting a flash to the subject to generate image data continuing after the first step;

a third step of applying first correction processing to the image data generated in the first step to generate first corrected image data and applying second correction processing different from the first correction processing to the image data generated in the second step to generate second corrected image data; and a fourth step of generating new image data based on the first corrected image data generated in the third step and the second corrected image data generated in the third step.

* * * * *